United States Patent Office.

ARTHUR VON GERSHEIM, OF CLEVELAND, OHIO.

COMPOSITION FOR ARTIFICIAL STONE.

SPECIFICATION forming part of Letters Patent No. 390,726, dated October 9, 1888.

Application filed May 31, 1887. Renewed April 16, 1888. Serial No. 270,777. (No specimens.)

*To all whom it may concern:*

Be it known that I, ARTHUR VON GERSHEIM, of Sachsenhof, near Feistritz, Kärnthen, Germany, a subject of the Emperor of Germany, now residing at Cleveland, in the county of Cuyahoga and State of Ohio, have invented a new and useful composition of matter for the production of a fire-proof cement and paint and the manufacture of artificial stone, and for plastering walls, tiling floors, and all analogous uses, of which the following is a full specification.

My composition consists of a mixture of pure chloride of magnesium and chloride of barium, prepared by adding to a solution of chloride of magnesium sufficient chloride of barium to bring the solution to a gravity of 5° to 40° Baumé, according to the use for which it is designed, and oxide of magnesia, with such coloring-matter and other mineral matter as may be suitable and required for the purpose to which the composition is to be applied. The application of chloride of barium to the chloride of magnesium removes the sulphuric-acid salts which are always present in the chloride of magnesium of commerce, and which do not resist the effects of the weather. The removal of the sulphuric-acid salts renders the resulting cement entirely proof against the action of the elements, and the mixture of chloride of magnesium, chloride of barium in solution, and oxide of magnesia forms of itself a cement of extreme hardness, tenacity, and durability, and when made sufficiently fluid may be used as a paint, forming a colorless and perfectly fire-proof protecting-covering for all wood-work, roofs, walls, ceilings, and architectural devices, and for all purposes to which a fire-proof paint or wash may be applicable. To the cement or paint so formed any mineral coloring-matter may be added to color it as desired, and by the further addition to the cement of finely-ground limestone, sand, or broken stone a plastering or an artificial stone may be produced, the composition in this last respect being an improvement upon that patented to me by Letters Patent of the United States, No. 363,864, dated May 31, 1887, by which the cost of production is cheapened, to admit of the more extended uses of the composition, by omitting the expensive magnesia-clay therein described, and using instead the oxide of magnesia.

The preparation of my composition is performed as follows: Chloride of magnesium of a pure quality is dissolved in pure water, and to the resulting solution chloride of barium is gradually added until the density of the solution reaches the desired degree, from 5° to 40° Baumé, when oxide of magnesia or calcined magnesia, finely ground, is added to make the fluid of the requisite thickness, less being required for paint and cement than for tiles or plastering. A suitable mineral color, finely ground, may also be added to suit the taste, and completes the composition for such purposes. For plastering and tiling and the production of cast or molded masses or artificial stone, finely-ground limestone, sand, or finely-broken natural stone is added in quantities varying from one-half the amount of oxide of magnesia used to fifteen or even twenty times the amount of oxide of magnesia, it being understood that the greater the proportion of oxide of magnesia employed the harder and more resistant will be the resulting mass when finished, and the greater the proportion of sand, limestone, or equivalent substance the more porous and friable in comparison will be the resulting stone, although even the largest proportion indicated will produce a mass sufficiently durable for flag-stones and architectural ornaments.

The above-described mixture of chloride of magnesium, chloride of barium, and oxide of magnesia, when to be used for paint or cement, may, in addition to the color or without the same, have added to it one-half the quantity of limestone which it contains of oxide of magnesia, and will still be sufficiently hard and refractory for such uses.

The proportions which I prefer and have found most efficient for the several purposes are as follows: For a thin mixture suitable for paint or cement to be applied as a wash, to each ten parts of the solution of chloride of magnesium and chloride of barium are added five to ten parts, by weight, of oxide of magnesia, and ten parts, by weight, of pulverized stone or equivalent mineral substance capable of forming a cement and color, if desired. For a thicker mixture suitable for plastering walls and for analogous uses, to each ten parts of the solution ten parts, by weight, of oxide of magnesia and from twenty to thirty parts of sand, ground limestone, or pulverized stone. For a thick mixture suitable for tiles, pavements, artificial stone, and analogous uses, to each six parts of the solution of chlorides, ten parts of oxide of magnesia and forty to sixty parts of sand, broken stone or pulverized stone, or equivalent mineral substances, color to suit being added in any case, if desired. The mixture when used for paint, cement, or plastering is applied in the usual manner for such uses. For artificial stone, tiles, paving, &c., it is poured, laid, or pressed in molds and allowed to harden spontaneously.

What I claim as my invention, and desire to secure by Letters Patent, is—

1. The above-described composition, consisting of solution of chloride of magnesium and chloride of barium, oxide of magnesia, and pulverized stone or equivalent substance, substantially in the proportions and for the purposes specified.

2. The composition consisting of chloride of magnesium and chloride of barium in solution, oxide of magnesia, and pulverized limestone, substantially as described.

ARTHUR V. GERSHEIM.

Witnesses:
FRANK WEDDELL,
LAURENCE WEDDELL.